United States Patent Office 3,495,354
Patented Feb. 17, 1970

3,495,354
HATCH COVERS AND LIKE CLOSURE DEVICES
Aufridus Maria Waldram, Amsterdam, Netherlands, assignor to Automotive Products Company Limited, Leamington Spa, Warwickshire, England
Filed May 28, 1968, Ser. No. 732,728
Int. Cl. E05d 15/26; B63b 19/18
U.S. Cl. 49—127                                                8 Claims

ABSTRACT OF THE DISCLOSURE

A hatch cover comprises one or more groups of hatch members each of which is hinged at one side to a transverse member which is bodily movable across the hatchway in a direction perpendicular to the length of said member, each said transverse member carrying a pivoted lever acting at one end on a hatch member carried by a next adjacent transverse member and co-operating with a fixed track so that, as the transverse members move towards a storage space for the hatch members to open the hatch the levers are pivoted to move the hatch members from a horizontal to a substantially vertical position.

---

This invention relates to hatch covers for covering hatchways providing access to the holds of ships or lighters, and to similar closures for other access openings.

The hatch cover according to the invention comprises one or more groups of hatch members which, when closing the hatchway or other opening are disposed in one plane one beside the other, the hatch members forming the group or each group being all moved into a storage place when the hatch is opened. For example, a single group of hatch members may move to a storage place at one side of a hatchway, two separate groups may move respectively to storage places one at each side of the hatchway, or two such groups may move to juxtaposed storage spaces at the centre of the hatchway. The movement of the hatch members from their open to their closed positions and vice versa may be effected by manual or power operated means.

It is the object of the present invention to provide a hatch cover or like closure device which can be opened and closed in a simple and reliable manner and which is relatively simple and economical in construction.

According to the invention, a hatch cover or like closure device comprising one or more groups of hatch members which, in their hatch closing position, are disposed one beside another in a common plane and are all moved to a storage place, at one side of the area covered by them, when the hatchway is open, is characterised in that each hatch member, on the side thereof nearest to the storage place, is hingedly supported on a transverse member which is bodily movable in a horizontal direction towards and away from the storage place, each said transverse member having pivotally mounted on it at least one lever which at its end remote from its pivot engages and acts on the hatch member at the side of the transverse member nearer to the storage space, and, at a position nearer to its pivot, co-operates with a guide track to move the said lever about its pivot and cause it to move the hatch member with which it co-operates upwardly about its pivot as the transverse member moves towards the storage place.

Preferably, the levers are two-armed levers having a longer arm to engage the hatch member and a shorter arm, at an angle to the longer arm to co-operate with the guide track.

Each hatch member may be provided on its underside with a projection which, when the hatch member is in its hatchway-closing position bears, at its side facing towards the storage place, against a roller at the end of the longer lever arm remote from the pivot of the lever.

The long arm of each lever, and the hatch member to be operated thereby, may be provided with co-operating entraining stops to enable the hatch member to be moved bodily towards the storage place by the lever, the entraining stop on the lever arm being at its end remote from its pivot.

Each lever may carry a roller co-operating with the guide track, and the said guide track may include a first portion remote from the storage place extending parallel to the plane of the closed hatch cover, a second portion extending a predetermined distance from the storage place which is also parallel to the said plane and closer thereto than the first portion, and a third, connecting portion which rises towards the said second portion.

When the cover according to the invention is opened, the whole assembly of hatch members is initially displaced horizontally over a small distance in the direction of the storage place. All the levers remain inoperative. Each hatch member is pushed during this displacement by one of the levers, through the afore-mentioned co-operating entraining stops. Thereafter, the guide-track engaging roller on the lever adjoining the storage place runs up the rising section of the guide track, the lever pivoting around its hinge and gradually pivoting the hatch member adjoining the storage place upwardly out of the horizontal position. When the end of the guide-engaging roller has reached the raised section of the guide track, the particular hatch member has reached a somewhat inclined position, the lever standing substantially vertically in relation to its hinge. Then, for the further maneuvering of the particular hatch member in the direction of the storage place, the lever must exert a very small force on the hatch member.

In a preferred embodiment of the invention, the hinge of each lever is disposed on a transverse member at a position spaced from the plane of the closed hatch cover by a distance intermediate between the distances of the planes of the first and third portions of the guide track from said closed hatch cover plane, and each lever extends to a place on the hatch member to be operated which is disposed between the centre of the hatch member and a place situated two-thirds of the length of the hatch member away from its hinge, the lever being acted on by the guide track at a distance from its pivot about one quarter of the distance from said pivot to the end of the lever which acts on the hatch cover.

The use of a lever also ensures a quiet, controlled upward pivoting of a hatch member; this is an advantageous feature for both opening and closing the cover. In this way, the particular hatch member arrives at the storage place in a substantially vertical position. The following hatch members are then hinged upwards successively. When all the hatch members have been hinged upwards, all the transverse members are in the storage place after having gone through only a horizontal displacement.

The use of the invention enables the cover to be opened in a very simple manner. This is advantageous, more particularly on lighters and craft for inland navigation, since in such cases the drive mechanism is usually manually operated. This can now be done by one operative. The simplicity of the different drive mechanisms used according to the invention reduces its costs. The simplicity is achieved by the automatic creation of a large vertical lever arm with the use of a lever for the upward hinging of each hatch member, while the transverse members are displaced exclusively in the horizontal plane.

The cover is closed in the converse manner. The downward hinging of a hatch member is initiated by the operation of the drive mechanism, the centre of gravity of the hatch member being located in front of the hinging place. Moreover, to initiate the downward hinging of a hatch member, both the free end of each lever and the hatch member to be operated by said lever can have co-operating entraining stops, the hatch member to be operated finding a support in the direction of downward hinging when a transverse member and the lever attached thereto are moved out of the storage place. After a hatch member has been hinged downwards, the roller on the end of the lever engages behind the aforementioned projection of the hatch member, so that the latter is entrained further in the horizontal direction away from the storage place.

While with smaller holds or similar spaces, all that is required is generally one storage place for a single group of hatch members on one side of said space, with larger holds or similar spaces, there may be two groups of hatch members and a storage place on each of two opposite sides of the hatchway, and the two groups of hatch members are moved, starting from the centre of the cover, in the direction of the two storage places. Alternatively, two groups of hatch members may be provided with a single storage space at the centre of the hatch cover.

At each end, each transverse member has at least two wheels co-operating with a track having guide surfaces both below and above the wheels, to prevent the transverse members from tilting.

Clearly, the horizontal dimensions of the storage places are also determined by the transverse members which bear against one another, and by the distance between the transverse members. To reduce these dimensions, according to another feature of the invention, the wheels at each end of each transverse member are so disposed that adjacent wheels on proximate transverse members lie in different vertical planes. The two wheels at one end of a transverse member can lie in a vertical plane which does not coincide with the vertical plane in which the two wheels of the corresponding end of the adjacent transverse member are disposed. However, the two wheels can alternatively be so disposed at one end of a transverse member that they lie in two different vertical planes. This is a preferred embodiment, since it produces uniformly constructed transverse members.

Each hatch member can have side plates which, when attached at an inclination to the hatch member, can ensure that the hatch members fit into one another in the substantially vertical storage position.

Preferably, each transverse member has at the side of the hatch member a channel-shaped member which extends parallel thereto and having upwardly directed side walls which, when the hatch cover is closed lie one on each side of the gap between the hatch member hinged to that transverse member and the next adjacent hatch member. These channels collect and remove any water leaking in between adjacent hatch members.

Preferably, the drive mechanism comprises at least one chain which is disposed outside the hatchway and which extends from the transverse member disposed furthest away from the storage place to an actuating member disposed on the other side of the storage place, at least the aforementioned transverse member having a set of three chain pulleys engaging with the chain, the central chain pulley engaging the side of the drive chain opposite to that engaged by the other two. Moreover, the central chain pulley can be mounted in a higher position than the two other chain pulleys and can be movable in a vertical direction relative to said other two chain pulleys. This feature enables any stretch in the chain to be compensated. However, any stretch in the chain can also be obviated by simply shortening the chain.

The equipment required for opening the cover can also be kept as simple as possible by making the hatch members as light as possible, while maintaining the required strength. To this end, the hatch members may be of laminated construction, comprising a core of watertight material having over at least a portion thereof a first layer of an adhesive primer and a second layer of plastics. The sandwich construction has the further advantage that no jigs are required for production purposes; this means a saving in manufacturing costs, since there is as yet no question of any general standardisation of dimensions for the manufacture of hatch members. The core of the sandwich, which preferably comprises a plurality of laminations secured together by a waterproof glue contributes not only towards the strength of a hatch member, but also towards its retention of shape. The layer of adhesive primer means that if the plastics is damaged, the adjacent adhesive holds good. The plastics layer, which is preferably polyester, contributes towards the strength of a hatch member and also has a protective function. More particularly, that side of each core which is adjacent the space to be covered is given a polyester layer, thus producing a flat surface for the roller at the end of the long arm of the operating lever. If the core is completely enclosed by a polyester layer, the fact that the core enables the hatch member to retain its shape means that the hatch member has a flat surface; this is advantageous both for the stowing of the hatch members in the storage place and for supporting any deck cargo disposed on the hatch.

According to another feature of the invention, an anti-slip coating is disposed on at least one side of the plastics layer.

The side edges and corners of the hatch members can have a metallic reinforcing profile encased in polyester.

According to another feature of the invention, all members of the cover exposed to weather when the cover is closed have a protective plastics layer.

Preferably, all the members for supporting and operating the hatch members are disposed inside the peripheral limits of the cover formed by the hatch members.

The invention will now be described in greater detail with reference to the accompanying drawings wherein.

Figure 1:
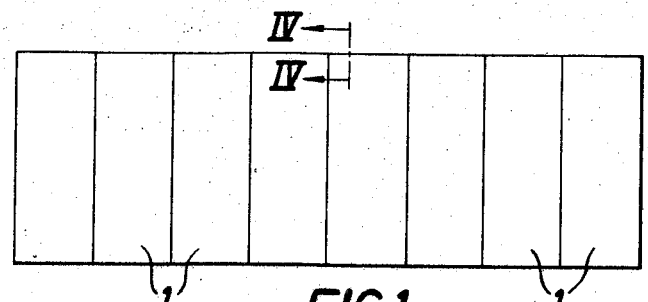
FIGURE 1 is a plan view of an exemplary hatch cover.
Figure 3:
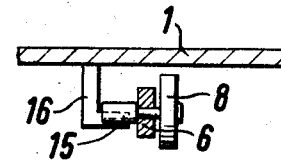
FIGURE 3 is a section, taken along the line III—III in FIGURE 2.

As is known, and shown in FIGURE 1, the hatchway providing access to the hold of a ship or lighter is normally covered by a number of hatch members 1 which in the closed position are disposed in one plane, one beside the other. When the hatch is opened, all the hatch members are moved into one or more storage places so as to expose the hatchway.

In the illustrated embodiment, only a single group of hatch members is provided, which move to a storage place at one side of the hatchway, but the application of the invention to the other arrangement already referred to herein will be obvious.

According to the invention each hatch member 1 (FIGURE 2) is hingably supported on a transverse member 2 on the side of said hatch member nearer to the storage place. In the preferred embodiment illustrated, each transverse member 2 has at each end a pair of wheels 4 by means of which each transverse member 2 can be horizontally reciprocated towards and away from the storage place. To prevent the transverse members 2 from tilting, the wheels roll in a closed track.

Hinged to each transverse member 2 at a place 5 is the elbow of at least one two-armed lever comprising a long arm 6 which in the preferred embodiment illustrated is at an acute angle to a short arm 7. The long arm 6 is used for pivoting towards a hatch member 1 disposed at the side of the storage place, and the said long arm 6 has preferably a roller 8 at its free end. In the closure position illustrated, the roller 8 is not in contact with the associated hatch member 1. For operation, each hatch member also has a projection 9 extending inwardly and which, in the closure position of the hatch member, bears against the side of the roller 8 remote from the storage place. The storage place has the reference 10. The end of the short arm 7 of the lever also has a rotating element, preferably a roller 11, resting on a guide track along which the roller can move. The guide track, of which a first portion remote from the storage place extends parallel with the plane in which the hatch members are disposed in the closure position, has a second portion 13 adjacent the storage place which is also parallel to the said plane and nearer to it, and a third, connecting portion 12 which rises towards the said second portion. The guide track may be disposed either outside the hatchway or inside it.

Figure 2:
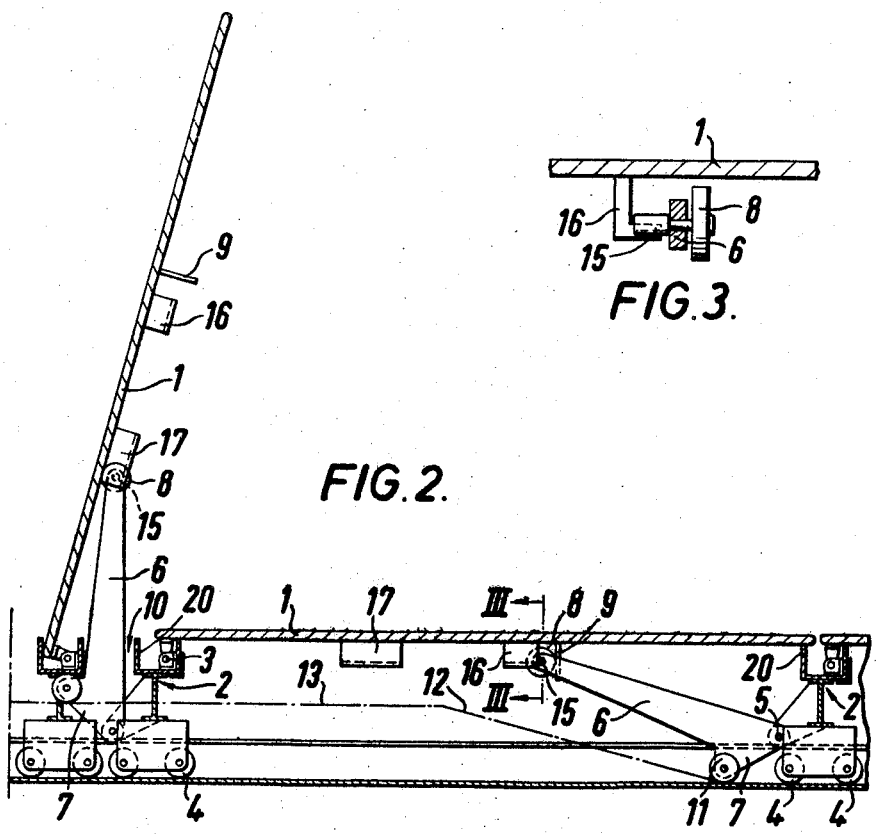
FIGURE 2 is a longitudinal section through a portion of the hatch cover shown in FIGURE 1, the cover being partly open.

In the position shown in FIGURE 2 the transverse member 2 on which the second hatch member 1 from the right is mounted is displaced in the direction of the storage place 10, the roller 11 on the lever 6, 7 carried thereby rolls up the rising section 12 and the arms 6, 7 of the lever gradually rotate clockwise around the pivot 5, so that the right-hand hatch member 1 is slowly pivoted upwards out of the horizontal position shown, at the same time hinging round its hinge at 3 on the transverse member 2 which is already in the storage place 10. In the preferred embodiment illustrated, the pivot 5 of the lever is disposed on the transverse member 2 at a position between the planes of the first and second portions of the guide track. The long arm 6 of the lever extends to a place on the hatch member to be operated lying between the centre thereof and a place two-thirds along the hatch member from its hinge axis. The short arm 7 is substantially one-quarter as long as the long arm 6. By using these dimensions of the lever the roller 11 contacts the raised section 13 of the guide track, when the roller 8 is substantially vertically above the pivot 5, the hatch member 1 having assumed a particular inclined position. With further displacement in the horizontal direction towards the storage place 10, the vertical distance between the place where the roller 8 touches the hatch member 1 and the hinge 3 thereof is so large that the force required for the further displacement is very small. The use of the lever with the long arm therefore produces a quiet and controlled pivoting of each hatch member, such as is indispensable for both the opening and closing of the cover. As shown in FIGURE 2, in the storage place the hatch members stand in a substantially vertical position.

Whereas during the opening of the cover the hatch members are hinged upwards, the transverse members are displaced exclusively in the horizontal direction.

Figure 4:
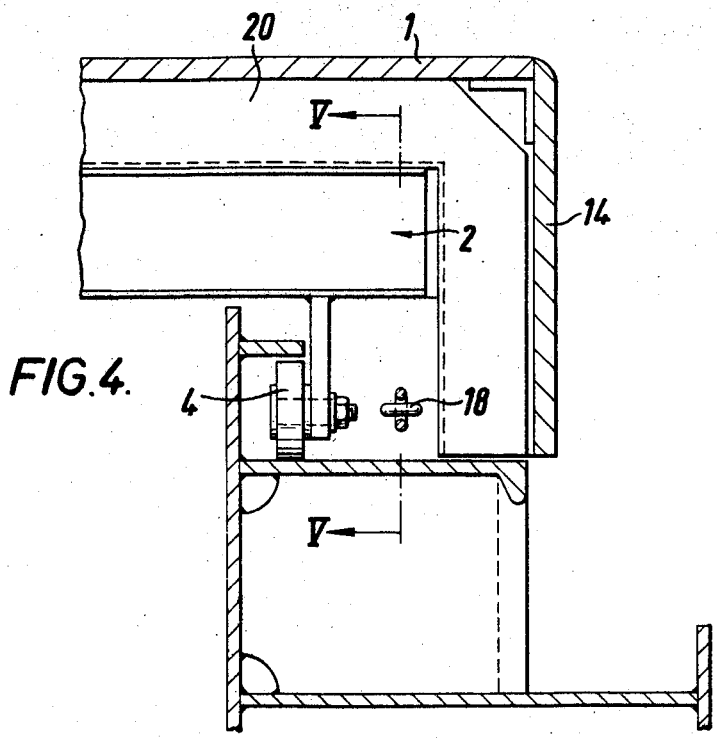
FIGURE 4 is a section, taken along the line IV—IV in FIGURE 1.

Clearly, the horizontal dimensions of the storage place are determined by the fact that the hatch members and the transverse members bear against one another. As a rule, each hatch member 1 has at its ends side plates, one 14 of which is shown in FIGURE 4. By fastening these side plates at an inclination to the plane of the hatch member, the latter can be caused to fit into one another in the substantially vertical storage position.

The space occupied by the transverse members in the storage place can be reduced by not placing the wheels of the transverse members in the same vertical plane. As a result, the distance apart of the transverse members placed against one another is determined to a lesser extent by the distance between the wheels. The two wheels at one end of the transverse member can be disposed in a vertical plane which does not coincide with the vertical plane in which the two wheels at the corresponding end of the adjacent transverse member are disposed. Alternatively, however, the two wheels can be so disposed at one end of a transverse member that they lie in two different vertical planes. This embodiment is preferred, since it permits uniformly constructed transverse members.

The closure movement of a hatch member is initiated by the centre of gravity thereof being placed in front of the hinge axis thereof, i.e., on the side adjacent the hatchway.

Now that a description has been given of the opening and closing of a single hatch member, the opening and closing of the whole cover will be described. For the opening of the cover, the transverse member furthest away from the storage place is driven towards the said storage place. The whole assembly of hatch members first moves horizontally over a small distance. The levers do not turn about their pivots. The roller 8 of each lever is not yet in contact with the undersurface of the hatch member to be operated; the roller 11 is bearing against the guide track. Only when the roller 11 contacts the rising section 12 of the guide track does the first hatch member start to be hinged upwards, whereafter the other hinged members in the assembly are hinged upwards successively.

During the closure of the cover, these events occur in the converse order. First of all the hatch member last hinged upwards folds back into the horizontal position. When the hatch member has reached the horizontal position, the roller 8 engages with the projection 9 of the hatch member 1, so that the latter is drawn in the horizontal direction away from the storage place.

When, during the opening of the cover, the assembly of hatch members is displaced horizontally by the transverse member disposed furthest away from the storage place being driven towards the said storage place, the hatch members not yet hinged upwards are pushed along each by the following hatch member. To avoid direct contact between the hatch members, both the free end of the long arm 6 of each lever, and the hatch member 1 to be operated thereby have entraining stops so co-operating that the force, which is exerted in the direction towards the storage place 10 during the displacement of a transverse member in that direction on the hatch member disposed at the side of the transverse member nearer to the storage place 10, is transmitted to that particular hatch member through the aforementioned entraining stops and not by the adjacent hatch members engaging one another. In a preferred embodiment of the invention, the entraining stop on the long arm 6 of each lever is a cam-shaped projection 15, disposed on the free end of the long arm at the side of said arm remote from the roller 8. The cam-shaped projection 15 extends parallel with the plane of the adjacent hatch member, while the co-operating entraining stop on the hatch member takes the form of an L-shaped projection 16, one limb of which extends at a distance from the hatch member and also parallel with the plane thereof. The two entraining stops 15, 16 are so located that when the assembly of hatch members is displaced, the stops 15, 16 contact one another before the hatch members 1 bear against one another. The stops 15, 16 are of such dimensions that during the clockwise rotation of the long arm 6 of each lever in conjunction with the upward hinging of the hatch member they release one another, the cam-shaped projection 15 moving into the space between the underside of the hatch member and the limb of the projection 16 which is parallel thereto.

During the closure of the cover, when the hatch members are successively hinged back into the horizontal position, their return movement can also be initiated by co-operation between the entraining stop 15 and another L-shaped member 17. In the storage position of each hatch member, the cam-shaped projection 15 is disposed between the underside of the hatch member and the L-shaped projection 17. If during the closure of the cover a transverse member is moved away from the storage place 10, and the hatch member 1 to be operated by the long arm 6 of the lever attached to said transverse member does not directly pivot into the horizontal position, the cam-shaped projection 15 contacts the limb of the L-shaped projection 17 which is parallel to the hatch member, thus initiating the return hinging movement thereof.

Although this is not absolutely necessary, both L-shaped projections 16 and 17 can take the form of one single L-shaped element extending in the direction in which the roller 8 travels.

With a small ship's hold, the hatch members for covering the hold are stored on only one side of the hatch. With a larger ship's hold there may be two separate groups of hatch members and two storage places opposite one another on either side of the hatch, or a single storage space in the middle. In the two latter cases the cover is opened by displacing the respective groups of hatch members starting from the centre in the direction of the two storage places, or starting from the sides towards the centre.

In the preferred embodiment illustrated, the two arms 6, 7 of each lever are at an acute angle in relation to one another. However, a lever can be used whose arms form an obtuse angle with one another.

Figure 5:
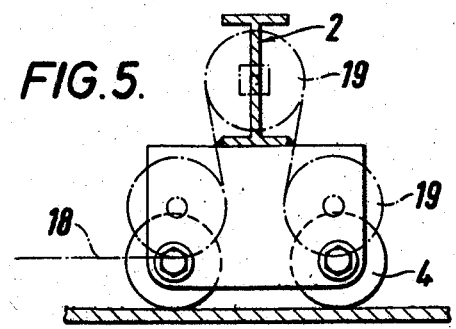
FIGURE 5 is a section, taken along the line V—V in FIGURE 4.

The drive mechanism for opening and closing the cover can be of any suitable construction. One suitable mechanism comprises at least one chain, one end of which is attached to the transverse member of a group of hatch members disposed furthest away from the storage place, while the other end runs over an operating member. As shown in FIGURE 4, this chain 18 can be disposed outside the hatchway of a ship or lighter. Preferably, a chain 18 of the kind specified is disposed on each side of the space to be covered, so that the forces to be exerted are symmetrical. As shown in FIGURE 5, each chain 18 extends over a set of three chain pulleys 19 disposed at the end of the transverse member disposed furtherst away from the storage place 10. The central pulley engages the side of the chain opposite to that engaged by the two other pulleys. Any tautening or slack in the chain can be obviated simply by shortening the chain at its ends.

In a preferred embodiment of the invention, the central chain pulley (FIGURE 5) is located above the two other chain pulleys; moreover, the central pulley is displaceable in a vertical direction. This provides another very simple manner of adjusting the tension in the chain 18.

The invention therefore provides a very simple and reliable way of opening and closing a hatch cover for the hold of a ship or lighter, or for other similar spaces, the costs being very low and the opening and closing being performable by a single operative.

Each transverse member 2 has a channel-shaped member 20 which extends parallel to the transverse member, and has upwardly directed side walls disposed on either side of the gap between the hatch member 1 hinged to the transverse member and the next adjacent hatch member 1. Any water leaking through the joints between adjacent hatch members is removed via this channel.

All the members required for opening and closing the cover can be disposed on the inside of the peripheral limits of the hatch members.

Preferably, each hatch member is of laminated constructed comprising a core of water-tight material having extending over at least a portion thereof a first layer of an adhesive primer and a second layer of plastics material. The sandwich construction has the advantage that no jig is required for producing the hatch member, thus reducing manufacturing costs for the small numbers of hatch members. This feature is all the more important, since the dimensions of ships hatchways are not standardised, and many different sizes need to be provided for.

The core of the hatch member is preferably made of laminated material the laminations of which are secured together by a waterproof adhesive. This core contributes towards the strength of a hatch member and also its retention of shape.

Before the plastics layer is applied, a layer of adhesive primer is applied to the core, so that if the plastics material is damaged, the adjacent adhesive will hold fast.

The plastics layer, preferably polyester, contributes towards the strength of a hatch member and also has a protective function. More particularly, the side of each core forming the underside of the cover has a polyester layer, thus producing a flat surface for the roller at the end of the long arm of the lever. If the core is completely enclosed by a polyester layer, the fact that the core makes the hatch member retain its shape means that the hatch member has a flat surface; this is advantageous for stowing the hatch members in the storage place and also for supporting any deck cargo to be placed on the hatch.

Preferably, the polyester layer on the upper side of the hatch member is given an anti-slip coating. Although this can be done in any suitable manner, it is preferably done by applying sand; this is very efficient due to the high adhesive strength of the polyester.

If necessary, the side edges and corners of the hatch members can have metallic reinforcing profiles which can be encased in the polyester.

Moreover, each hatch member can be completely made of a suitable metal.

Preferably, the transverse members 2 are made of steel, to produce the required strength and retention of shape. The water-catching channels 20 disposed on the transverse members 2 are preferably made of polyester. In general, all parts of the cover exposed to weather when the cover is closed may be made of polyester. The purpose of this is to reduce maintenance work to the minimum, in conjunction with achieving low manufacturing costs.

Clearly, the various members of the cover can be differently constructed without exceeding the scope of the invention.

I claim:
1. A hatch cover closure device comprising a plurality of panels disposed in side by side relationship in the same plane, a transverse member disposed along one side of each panel, means disposed on each panel adjacent its transverse member pivotally connecting each panel to its respective transverse member to permit tilting of the panel in a vertical plane, a panel lifting lever operatively connected to the underside of each panel for lifting the panel in a vertical direction, said lever having a long arm and a short arm disposed at an angle with each other, pivot means connecting the lower end of the long arm to the transverse member of the next adjacent panel, guide track means disposed below a panel, and means disposed on said short arm for sliding movement along said guide track means to cause pivoting of said long arm in a clockwise motion to tilt the panel upwardly to an open position.

2. The device of claim 1 wherein said arms are disposed at an acute angle with respect to each other.

3. The device of claim 2 wherein said long arm is provided with roller means which operatively engage said panel underside.

4. The device of claim 3 wherein said means disposed on said short arm for sliding movement are roller means.

5. The device of claim 4 wherein each panel is provided on its underside with a projection which bears against said roller means when the panel is in a horizontal position.

6. The device of claim 5 wherein said long arm has an entraining stop on its upper end which co-operates with said long arm roller means.

7. The device of claim 6 wherein said entraining stop is an L-shaped projection with one leg extending parallel to the panel.

8. The device of claim 7 wherein each transverse member is provided with roller means to permit rolling of each member along a surface.

References Cited

UNITED STATES PATENTS

| | | | |
|---|---|---|---|
| 2,574,312 | 11/1951 | Altube | 160—206 |
| 2,771,136 | 11/1956 | Leconte | 160—206 X |
| 2,774,420 | 12/1956 | Leconte. | |

FOREIGN PATENTS

| | | |
|---|---|---|
| 990,190 | 4/1965 | Great Britain. |
| 1,172,568 | 6/1964 | Germany. |
| 649,966 | 12/1962 | Italy. |
| 175,585 | 6/1961 | Sweden. |

DENNIS L. TAYLOR, Primary Examiner

U.S. Cl. X.R.

114—202; 160—206